Oct. 27, 1942.  E. T. NEWELL  2,299,922

END GATE CONTROL FOR TRUCK BODIES

Filed April 29, 1941

Inventor
Edward T. Newell
By [signature]
Attorney

Patented Oct. 27, 1942

2,299,922

UNITED STATES PATENT OFFICE 2,299,922

ENDGATE CONTROL FOR TRUCK BODIES

Edward T. Newell, Portland, Oreg.

Application April 29, 1941, Serial No. 390,986

6 Claims. (Cl. 298—23)

This invention relates to end gate controls for truck bodies and the like, and particularly dump bodies.

The primary object of this invention is to provide a control mechanism for latching or unlatching the end gate of dump bodies on trucks, wherein the control lever is located within the cab of the truck.

Another object of this control mechanism is to position the control lever within the cab of the truck, within reach of the operator, but still out of the way of the driver while getting in and out of the truck.

And another object of the invention is to provide a holding mechanism between the latches for holding the end gate closed and the control lever within the cab of the truck, said control mechanism holding the latches of the end gate in holding position, without any auxiliary locking means within the control mechanism that has to be manipulated by the operator of the truck. By the use of my new control mechanism, the operator of the truck may control the latching mechanism on the end gate by simply moving the control lever in either direction, without having to unlock any holding mechanism.

A further object of my invention is to provide a control mechanism that can be so positioned on the frame of the truck as to avoid any obstructions that may be in the way, such as battery boxes and so forth, and still bring the operating lever within handy reach of the truck driver.

A still further object of my invention is to provide a control mechanism for operating the end gate of dump bodies from the cab of the truck, regardless of the angle of the body of the truck.

These and other incidental objects will be apparent in the drawing, specifications and claims.

Referring to the drawing.

In the drawing.

Figure 1:
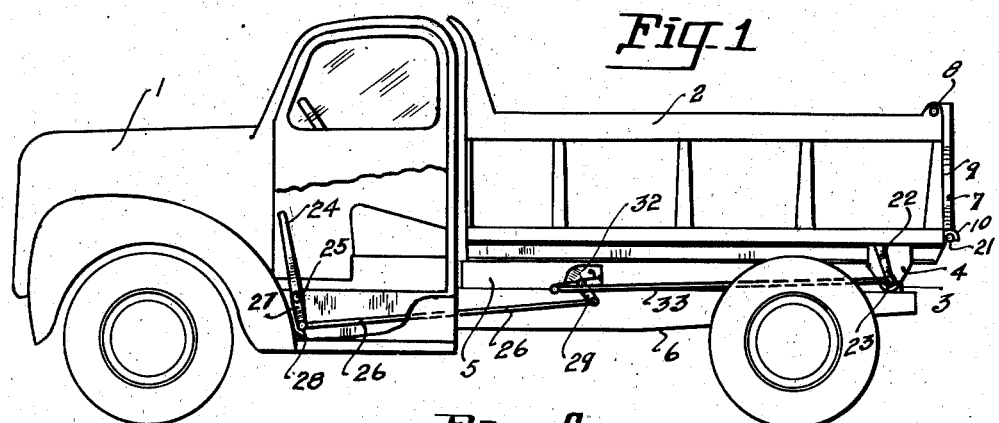
Figure 1 is a side elevation of a truck having a dump body thereon, parts broken away for convenience of illustration.

A conventional truck is illustrated by numeral 1, having a dump body 2, pivotally mounted thereon at 3 by the fitting 4, as commonly used. The fitting 4 is pivotally mounted to the base 5 of the dump body 2. The base 5 is mounted upon the truck frame 6 in any suitable manner. The end gate 7 is pivotally mounted to the body 2 at 8, and is held against the end of the body at 9, by any of the well known forms of latches 10. These latches are already incorporated within the body at the present time, and may take various forms of construction.

Figure 3:
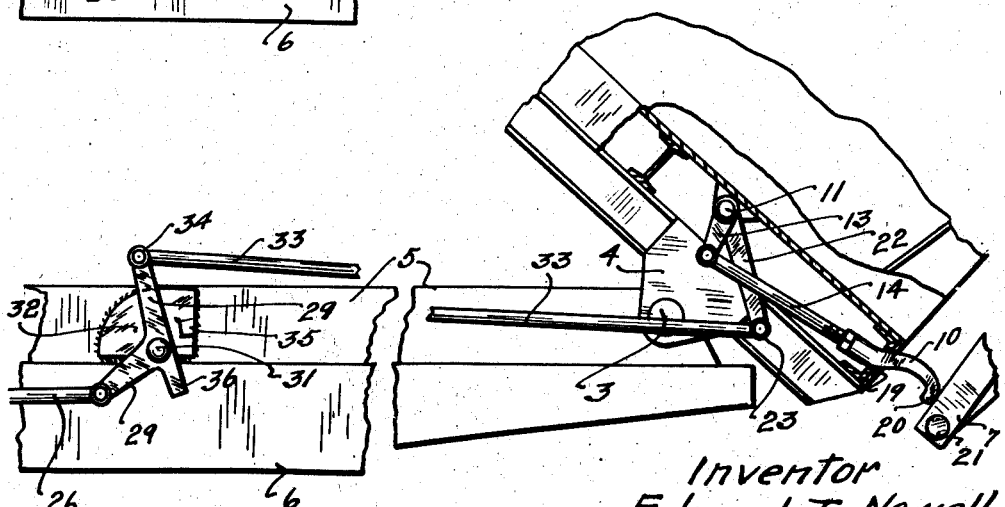
Figure 3 is an enlarged fragmentary detail view of Figure 2, illustrating the dump body tilted at an angle, and the control mechanism having released the end gate.

My invention consists of operating latches 10 by a control mechanism, which I will now describe. A cross shaft 11 extends transversely of the body 2 and is mounted thereto by suitable bearing supports 12, having crank arms 13 fixedly secured to each of its ends. A connecting link 14 is pivotally mounted at 15 to each of the crank arms 13 at its one end, and secured to the hook 10 at its opposite end by being threaded into the hook at 16 and locked thereto by a locking nut 17. In this particular design of hook, an inclined surface 18 works within the opening or guideway 19, raising the end of the hook 20 clear of the pin 21 when forced rearwardly, best illustrated in Figure 3. The pin 21 is fixed to the end gate 7 in the usual manner. I do not wish to be limited to any gate holding latch construction, as my control will operate any form of holding latch.

A crank arm 22 is fixedly secured at one end to one end of the shaft 11 and has its free end 23 positioned directly in line with the pivot point 3, where the body 2 is pivotally mounted to the frame 5. The lever 22 is maintained in this position while the hooks 10 are holding the gate 7 in locked or closed position, so that when the body 2 is raised to dumping position the end 23 of the crank arm 22, will remain on the hinged center line between the body 2 and the truck frame 5, thereby in no way affecting the locking hooks 10 relative to their holding position. The crank arm 22 is operated by the control lever 24, which is pivotally mounted at 25 within the cab of the truck 1, in the following manner.

A connecting link 26 is pivotally secured at one end to the lower arm 27 of the lever 24 as at 28 and a bell crank 29 is connected at 30 to the opposite end of link 26. The bell crank 29 is pivotally mounted at 31 to a base plate 32, which base plate may be secured to the frame 5 of the truck or to any other convenient location, as by welding or other suitable fastening means.

A second connecting link 33 is pivotally secured to and between the bell crank 29, as at 34, and the free end of the crank arm 22 as at 23.

Figure 2:
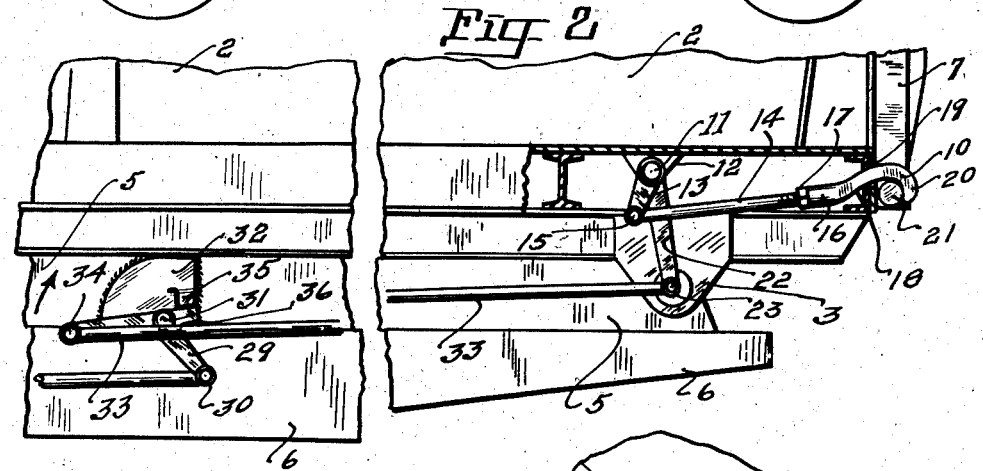
Figure 2 is a fragmentary enlarged detail view of the control mechanism in the position shown in Figure 1.

Referring to Figures 1 and 2, the control mechanism for holding the end gates is shown in holding position, and while in this position the connecting link 33 is shown below the pivot point 31 of the bell crank 29, and is prevented from going beyond the position shown by a stop 35 engaging the end 36 of the bell crank 29. Therefore, the point 34 of the crank 29 has passed below the dead center line of the pivot point 31 relative to the connecting link 33, preventing the hooks 10 from pulling the connecting link 33 to the right. This is an important feature of my invention, wherein the bell crank passes center for holding the end gate closed.

I will now describe the operation of the unlocking of the end gates. The operator pulls the lever 24 rearwardly, forcing the connecting link 26 forward, which will rotate the bell crank 29 in the direction of the arrow, from the positions shown in Figures 1 and 2 to the position shown in Figure 3, forcing the connecting link 33 to the right, together with the crank arm 22, rotating the shaft 11 and the crank arms 13, forcing the connecting links 14 and hooks 16 to the right. At the same time the cam surfaces 18 will raise the ends 20 of the hooks 10 so as to clear the holding pins 21 of the end gate 7. Due to the fact that the pivot point 23 of the crank arm 22 and the connecting link 33 are on line with the pivot point 3 of the dump body 2, it makes no difference what angle the truck body may be in when the unlocking of the end gate takes place.

It will be noted by observing Figure 1, that when the end gate is locked the lever 24 is in a forward position out of the way of the truck driver getting in or out of his cab, and when the end gate is not locked, the lever will be in the rearward position and out of the way of the driver of the truck. This is an important feature, as in case of accident and so forth there will be no obstructions created by the lever 24.

Another feature of my new and improved control mechanism is that the bell crank 29 may be positioned midway between the control lever 24 and the gate latches, shortening the length of the control rod, doing away with vibrations and avoiding obstructions on the truck. The bell crank and its mounting takes all of the pulling stress exerted by the end gate of the truck, and in no way transmits this stress to the operating lever 24.

I do not wish to be limited to the particular mechanical construction illustrated, as other mechanical equivalents may be used, still coming within the scope of the claims to follow.

What is claimed as new is:

1. An end gate control for dump bodies, comprising latches for holding the gate in closed position, linkage connected to the latches for operating the same, a lever for operating the linkage and means to compel movement of the linkage in response to lever movement, said means including a pivoted bell-crank to which the linkage and lever are connected, the linkage-end of the bell-crank lever being movable from above the dead center line position of the bell-crank to a position below such dead center line position, and a stop positioned to limit movement of the bell-crank to a predetermined position below its dead center line, the linkage when the bell crank is above its dead center line acting to move the latches to release position, and when in a position responsive to a movement of the bell-crank below its dead center line position acting to move the latches into locking positions.

2. An end gate control for dump bodies, comprising latches for holding the gate in closed position, linkage connected to the latches for operating the same, a pivoted bell crank to one arm of which the forward end of the linkage is connected, a manually operable lever connected to the remaining arm of the bell crank for operating the linkage in the movement of the lever, the lever moving the linkage-connected end of the bell-crank from a point above to a point below the dead center line of such bell crank in closing the latches, and a stop for the bell crank to limit the linkage connected end thereof to such below dead center-line position.

3. A construction as defined in claim 2 including an intermediate bell crank to which the linkage is connected, said intermediate bell crank being carried by and movable with the dump body.

4. A construction as defined in claim 2 including means for moving the latch with respect to its keeper in the movement of the linkage.

5. An end gate control for dump bodies of dump wagons comprising a latch, a keeper on the gate to be engaged by the latch to hold the gate in closed position relative to the body, a bell crank supported on and movable with the body, a connection between said bell crank and the latch, a second bell crank pivotally mounted on the frame of the dump wagon, a first link connecting said bell cranks, means for limiting movement of the first-link connected end of the second bell-crank to a predetermined below dead center line position in a latch-closing operation, a manually operable lever, and a second link between said lever and said second bell crank, the connection of the second link and second bell crank moving the forward end of said first link below the pivot of the second bell crank when said second bell crank is in limited position.

6. An end gate control for dump truck bodies, comprising a hand control lever for controlling the latch for holding the end gate closed, a locking mechanism between the hand control lever and the end gate latches, said locking mechanism comprising a pivotally mounted bell crank rotatably secured to the frame of the truck, a connecting link connecting one of the arms of the bell crank to the hand control lever, a connecting link connecting the end gate holding latches to the other arm of the bell crank, the connecting link between the end gate latches and the bell crank passing below the pivot point of the bell crank while in holding position, and a stop engaged by the bell crank when in such below-the-pivot-point position.

EDWARD T. NEWELL.